(12) United States Patent
Chen et al.

(10) Patent No.: US 12,444,033 B2
(45) Date of Patent: Oct. 14, 2025

(54) ENCODER, DECODER, SYSTEM, AND METHOD FOR DETERMINING TONE MAPPING CURVE PARAMETERS

(71) Applicant: HUAWEI TECHNOLOGIES CO., LTD., Shenzhen (CN)

(72) Inventors: Hu Chen, Munich (DE); Yichuan Wang, Beijing (CN); Weiwei Xu, Hangzhou (CN); Quanhe Yu, Beijing (CN); Elena Alexandrovna Alshina, Munich (DE)

(73) Assignee: Huawei Technologies Co., Ltd, Shenzhen (CN)

( * ) Notice: Subject to any disclaimer, the term of this patent is extended or adjusted under 35 U.S.C. 154(b) by 458 days.

(21) Appl. No.: 17/982,221

(22) Filed: Nov. 7, 2022

(65) Prior Publication Data
US 2023/0057829 A1 Feb. 23, 2023

Related U.S. Application Data

(63) Continuation of application No. PCT/CN2020/089134, filed on May 8, 2020.

(51) Int. Cl.
*G06T 5/94* (2024.01)
*G06T 5/40* (2006.01)

(52) U.S. Cl.
CPC ............... *G06T 5/94* (2024.01); *G06T 5/40* (2013.01); *G06T 2207/10016* (2013.01); *G06T 2207/20208* (2013.01)

(58) Field of Classification Search
CPC ... G06T 5/94; G06T 5/40; G06T 2207/10016; G06T 2207/20208; G06T 5/92
See application file for complete search history.

(56) References Cited

U.S. PATENT DOCUMENTS 10,219,345 B2 2/2019 Yan et al.
11,741,873 B2 * 8/2023 Nijland .................... G09G 5/10
  345/690
(Continued)

FOREIGN PATENT DOCUMENTS

CN 102763134 A 10/2012
JP 2007228451 A 9/2007
(Continued)

OTHER PUBLICATIONS

Mantiuk et al., "HDR-VDP-2: A calibrated visual metric for visibility and quality predictions in all luminance conditions," ACM Transactions on Graphics, vol. 30, No. 4, Article 40, Total 14 pages (Publication date: Jul. 2011).
(Continued)

*Primary Examiner* — Tsung Yin Tsai
(74) *Attorney, Agent, or Firm* — Leydig, Voit & Mayer, Ltd.

(57) ABSTRACT

The present disclosure relates generally to the field of video processing, and more particularly to high dynamic range (HDR) video and image processing. In particular, the present disclosure relates to determining one or more curve parameters of a tone mapping curve. For example, a device (encoder or decoder) may obtain a high dynamic range (HDR) video frame and metadata associated to the HDR video frame. The device further obtains a pair of anchor points, based on the HDR video frame and the metadata. The pair of anchor points comprises a first anchor point and a second anchor point of the tone mapping curve. Moreover, the device generates the one or more curve parameters of the tone mapping curve based on the pair of anchor points.

19 Claims, 12 Drawing Sheets

(56) References Cited

U.S. PATENT DOCUMENTS

| | | | | |
|---|---|---|---|---|
| 2008/0297596 | A1* | 12/2008 | Inomata | H04N 5/91 348/229.1 |
| 2011/0292246 | A1* | 12/2011 | Brunner | H04N 23/70 382/167 |
| 2017/0180759 | A1* | 6/2017 | Mertens | H04N 19/98 |
| 2017/0186141 | A1* | 6/2017 | Ha | H04N 9/67 |
| 2018/0005356 | A1* | 1/2018 | Van Der Vleuten | H04N 19/182 |
| 2018/0218481 | A1* | 8/2018 | Evans | H04N 7/15 |
| 2019/0019277 | A1* | 1/2019 | Chen | H04N 5/57 |
| 2019/0130542 | A1* | 5/2019 | Tichelaar | G06T 5/90 |
| 2019/0222818 | A1* | 7/2019 | Yamamoto | H04N 5/66 |
| 2021/0152801 | A1* | 5/2021 | Wang | H04N 23/86 |
| 2021/0224963 | A1* | 7/2021 | Uchimura | H04N 5/57 |
| 2022/0262293 | A1* | 8/2022 | Nijland | G09G 3/20 |
| 2023/0054046 | A1* | 2/2023 | Xu | G06T 5/92 |
| 2024/0153051 | A1* | 5/2024 | Xu | G06T 5/50 |

FOREIGN PATENT DOCUMENTS

| | | |
|---|---|---|
| JP | 7476354 B2 | 4/2024 |
| KR | 20190100416 A | 8/2019 |
| WO | 2012125802 A1 | 9/2012 |
| WO | 2018111682 A1 | 6/2018 |
| WO | 2018152063 A1 | 8/2018 |
| WO | 2019160986 A1 | 8/2019 |
| WO | 2020060980 A1 | 3/2020 |

OTHER PUBLICATIONS

Report ITU-R BT.2408-3, "Guidance for operational practices in HDR television production," BT Series Broadcasting service (television), International Union of T.elecommunication, Geneva, Switzerland, Total 44 pages (Jul. 2019).

SMPTE ST 2094-10:2016, "Smpte Standard Dynamic Metadata for Color Volume Transform—Application #1," Total 15 pages (May 2016).

SMPTE ST 2094-20:2016, "SMPTE Standard Dynamic Metadata for Color Volume Transform—Application #2," Total 23 pages (Jul. 2016).

SMPTE ST 2094-30:2016, "Smpte Standard Dynamic Metadata for Color Volume Transform—Application #3," Total 15 pages (Jul. 2016).

SMPTE ST 2094-40:2016, "Smpte Standard Dynamic Metadata for Color Volume Transform—Application #4," Total 26 pages (Sep. 2016).

* cited by examiner

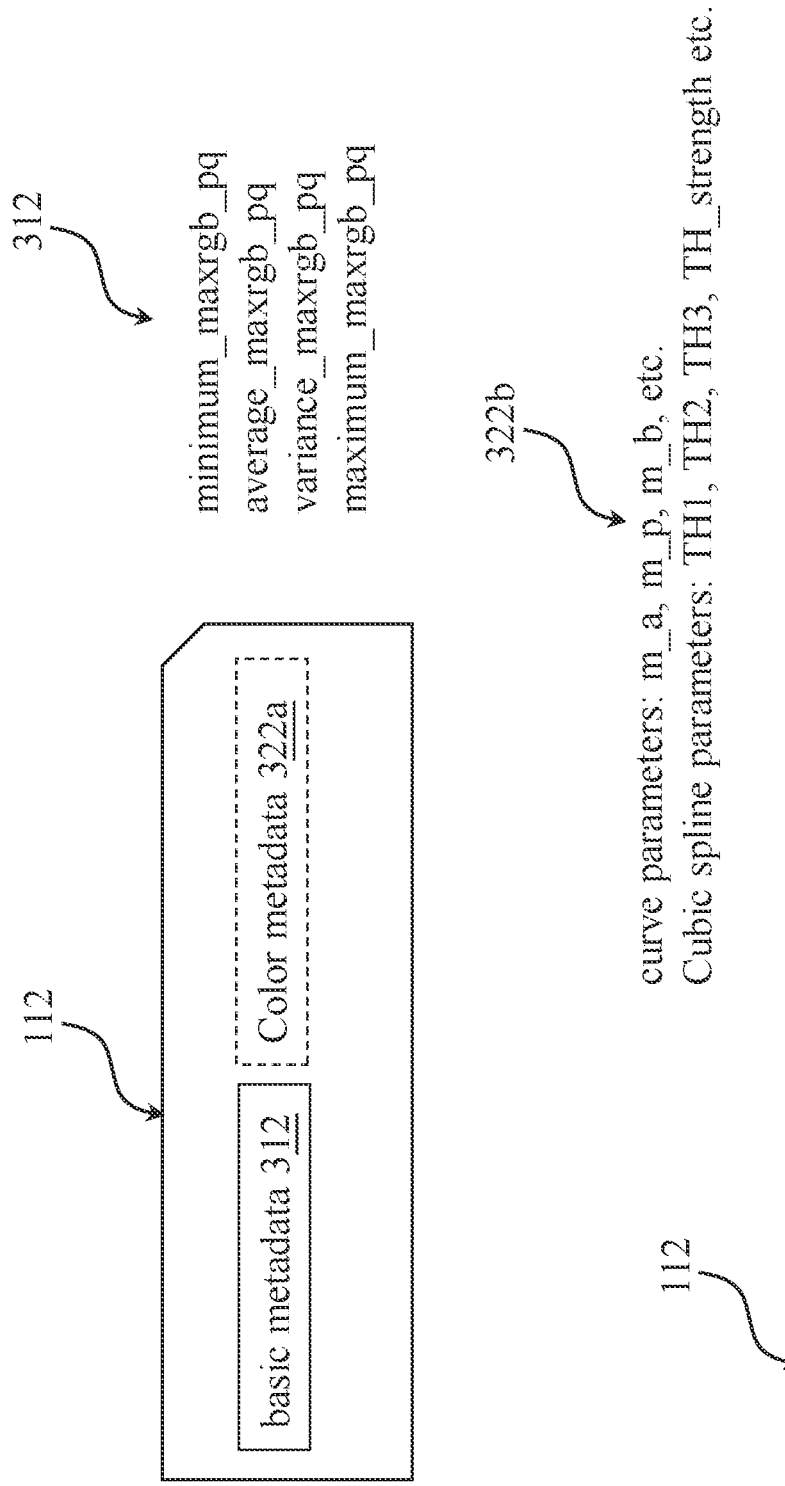

ENCODER, DECODER, SYSTEM, AND METHOD FOR DETERMINING TONE MAPPING CURVE PARAMETERS

CROSS-REFERENCE TO RELATED APPLICATIONS

This application is a continuation of International Application No. PCT/CN2020/089134, filed on May 8, 2020, the disclosure of which is hereby incorporated by reference in its entirety.

TECHNICAL FIELD

The present disclosure relates generally to the field of video processing and more particularly to high dynamic range (HDR) video and image processing. To this end, a method for determining one or more curve parameters of a tone mapping curve, an encoder for encoding HDR video frames, a decoder for decoding HDR video frames, and a system comprising an encoder and a decoder, are disclosed. In particular, the one or more curve parameters of the tone mapping curve may be generated based on a pair of previously obtained anchor points.

BACKGROUND

Generally, in digital imaging, a dynamic range may refer to the luminance range of a scene being photographed, the limits of the luminance range that a given digital camera or film can capture, or the luminance range that a display is capable of displaying.

The dynamic range of a typical real world scene is often between $10^{-3}$ nit and $10^6$ nit. In comparison, a consumer display usually has a much smaller dynamic range. If it is desired to display the real world scene on the display, there is thus often the need to scale down the high dynamic range of the real world scene to a lower dynamic range for the display: this process is called tone mapping. Tone mapping is generally a non-linear mapping process. In HDR image and video processing, a Perception Quantization (PQ) curve is often used to transfer an optical signal in nit or cd/m² to an electric signal between 0 and 1. The equation for a typical PQ curve is given in the following:

$$L' = \text{PQ\_TF}(L) = \left(\frac{c_1 + c_2 L^{m_1}}{1 + c_3 L^{m_1}}\right)^{m_2}$$

wherein L is the brightness value in the linear domain, and ranges for example between 0 nit to 10000 nit, and L can be, for example, an R value (brightness value of the Red component), a G value (brightness value of the Green component) or a B value (brightness value of the Blue component), or the luminance component Y.
L' denotes the electric signal in the PQ domain and is included in or comprises values within the range [0, 1], which is often referred to as the PQ value or the value in the PQ domain.

$$m_1 = \frac{2610}{4096} \times \frac{1}{4} = 0.1593017578\,125,$$

$$m_2 = \frac{2523}{4096} \times 128 = 78.84375,$$

$$c_1 = c_3 - c_2 + 1 = \frac{3424}{4096} = 0.8359375,$$

$$c_2 = \frac{2413}{4096} \times 32 = 18.8515625,$$

$$c_3 = \frac{2392}{4096} \times 32 = 18.6875.$$

The input of the PQ transfer function is the optical signal in the linear domain, and the output is the electric signal in the PQ domain. Because there is a one-to-one mapping, the input and output values are actually equivalent, if no quantization is applied. Only they are in two different domains, i.e., the linear domain and the PQ domain.

Moreover, the PQ Electro-Optical Transfer Function (OETF) is often used for quantization. The HDR image in the linear domain is first transferred to the PQ domain, and is then quantized to 10 bits or 12 bits. The images in the PQ domain may be compressed by a codec for storage or transmission. The quantization in the PQ domain is more uniform to a human visual system, because the human visual system is non-linear. If the quantization were conducted in the linear domain, the perceptual distortion would be much larger.

Some conventional methods for conducting the tone mapping are based on using a plurality of points for determining the tone mapping curve to be used. Moreover, some conventional methods are based on using a first curve (e.g., a linear curve) in the low light area, a second curve (e.g., a parabola) for the mid-tone range, and a third curve (e.g., a linear curve) in the high light area.

However, an issue of the conventional methods is that the values of the points, or the different parts of the various tone mapping curves themselves, cannot be chosen freely, which largely limits the flexibility of the final shape of the tone mapping curve.

Another issue of the conventional methods is, that it is rather difficult to choose curve parameters of the tone mapping curve.

Thus, there is a need for an improved method for tone mapping.

SUMMARY

In view of the above-mentioned problems and disadvantages, embodiments of the present disclosure aim to improve the conventional methods, encoders, decoders, and systems, respectively, for tone mapping. An objective is to provide a method for determining one or more curve parameters of a tone mapping curve, in order to obtain an improved tone mapping curve, suitable for the tone mapping of an HDR video frame. Embodiments in particular provide more flexibility to obtain the final shape of the tone mapping curve. Embodiments furthermore are efficient and resource conservative.

The objective is achieved by embodiments of the disclosure as described in the enclosed independent claims. Advantageous implementations of the embodiments of the disclosure are further defined in the dependent claims.

In particular, embodiments of the present disclosure may comprise obtaining a pair of anchor points, fine tuning the anchor points, and using the fine-tuned anchor points to generate curve parameters of a tone mapping curve.

A first aspect of the disclosure provides a method for determining one or more curve parameters of a tone mapping curve, the method comprising obtaining an HDR video frame and metadata associated to the HDR video frame; obtaining a pair of anchor points, wherein the pair of anchor points comprises a first anchor point and a second anchor point of the tone mapping curve, based on the HDR video frame and the metadata; and generating the one or more curve parameters of the tone mapping curve based on the pair of anchor points.

The method may be performed (e.g., completely or partially) by an electronic device such as an encoder, a decoder, a system comprising an encoder and a decoder, an HDR system, an HDR television (TV), an HDR color grading software, an HDR video transcoder, etc.

The method may be used for determining the one or more curve parameters of the tone mapping curve. The tone mapping curve may be an adaptive HDR tone mapping curve. For example, the tone mapping curve (e.g., the parameters of the tone mapping curve) may be adaptively determined for different HDR video frames. The tone mapping curve may represent a mapping (e.g., performed by the decoder) of the input brightness values (x-coordinate) to output brightness values (y-coordinate values).

An example of the tone mapping curve of the present disclosure may be a basic curve of the China Ultra-HD Video Industrial Alliance (CUVA) HDR standard.

Furthermore, the HDR video frame and the metadata associated to the HDR video frame may be obtained. For example, the HDR video frame may be in the Perceptual Quantizer (PQ) domain, or it may be transformed to the PQ domain. Moreover, the metadata associated to the HDR video frame may be derived, or extracted, from the HDR video frame. The metadata may be, or may include, statistical data defining brightness characteristics of the HDR frame, e.g. derived or extracted from the HDR frame and/or other HDR frames, e.g. of a same scene.

For example, the tone mapping curve may be the basic curve of the CUVA HDR standard, and the metadata may comprise the "MinSource" values, and the "MaxSource" values as defined in the CUVA HDR standard.

In some embodiments, the method further comprises obtaining the pair of anchor points, in the PQ domain.

Overall, the method of the first aspect provides an efficient and resource conservative way to obtain one or more curve parameters of a tone mapping curve, wherein the curve parameters enable the decoder to obtain a tone mapping curve that may be optimized for tone mapping the HDR video frame. Thus, an improved tone mapping curve may be obtained for tone mapping of the HDR video frame.

In an implementation form of the first aspect, the obtaining a pair of anchor points comprises obtaining a plurality (e.g. at least two, three, or four) of pairs of anchor points; generating a piecewise linear curve for each pair of the plurality of pairs of anchor points; performing tone mapping on the HDR video frame based on each of the piecewise linear curves to obtain a plurality of tone-mapped HDR video frames; and selecting the pair of anchor points for generating the one or more curve parameters from the plurality of pairs of anchor points based on the plurality of tone-mapped HDR video frames.

For example, in some embodiments, the plurality of pairs of anchor points (e.g., at least two pairs of anchor points) may be obtained. Moreover, a piecewise linear curve may be generated based on each pair of anchor points, i.e., at least two piecewise linear curves may be generated. Moreover, for each piecewise linear curve, the tone mapping on the HDR video frame may be performed, and at least two tone-mapped HDR video frames may thereby be obtained. Based on these, the pair of anchor points for generating the tone mapping curve may be selected, e.g. based on a criterion representing or indicative of a quality measure of or for each of the tone-mapped HDR frames obtained using the piecewise liner curves (e.g. a local contrast, a color distortion model or perceptual quality model for frames, in particular HDR frames).

In an implementation form of the first aspect, the obtaining a pair of anchor points comprises obtaining a plurality (e.g. at least two, three or four) of pairs of anchor points; constructing a piecewise linear curve for each of the pairs of anchor points; estimating a change of local contrast of the HDR video frame for each of the piecewise linear curves; and selecting the pair of anchor points leading to the highest local contrast.

In an implementation form of the first aspect, the obtaining a pair of anchor points comprises obtaining a plurality (e.g. at least two, three or four) of pairs of anchor points including an initial pair of anchor points; constructing a piecewise linear curve for each of the pairs of anchor points; estimating a change of local contrast of the HDR video frame for each of the piecewise linear curves compared to the local contrast of the HDR video frame tone-mapped by using the piecewise linear curve constructed using the initial pair of anchor points; and selecting the pair of anchor points leading to the highest local contrast.

The selection of the pair of anchor points for generating the curve parameters from the plurality of pairs of anchor points allows to improve the tone mapping curve, e.g. allows to determine one or more curve parameters of a tone mapping curve improving the perceptual quality, e.g. contrast, of the HDR video frame after tone mapping.

In a further implementation form of the first aspect, the piecewise linear curve of each pair of anchor points connects a predetermined minimum anchor point with the respective first anchor point, the respective first anchor point with the respective second anchor point, and the respective second anchor point with a predetermined maximum anchor point.

In a further implementation form of the first aspect, the selecting the pair of anchor points for generating the one or more curve parameters comprises determining for each of the plurality of tone-mapped HDR video frames a local contrast to obtain a plurality of local contrasts; and selecting the pair of anchor points for generating the one or more curve parameters from the plurality of pairs of anchor points based on the plurality of local contrasts.

For example, the plurality of local contrasts may be obtained for the plurality of tone-mapped HDR video frames (i.e., a local contrast for each tone-mapped HDR video frame). Moreover, the pair of anchor points may be selected that leads to the maximum or highest local contrast (e.g., the selected pair of anchor points is a pair of anchor points that is used for obtaining the tone-mapped HDR video frame with the maximum local contrast).

The selection of the pair of anchor points, for generating the one or more curve parameters, from the plurality of pairs of anchor points based on the local contrasts, may lead to an improved tone mapping curve.

In a further implementation form of the first aspect, the obtaining a plurality of pairs of anchor points comprises obtaining an initial pair of anchor points; and obtaining further pairs of anchor points based on the initial pair of anchor points.

In some embodiments, the x and y coordinate values of the second anchor point of any pair are always larger than the x and y coordinate values the respective first anchor point.

In a further implementation form of the first aspect, an x-coordinate value of a first anchor point of a further pair of anchor points is identical to an x-coordinate value of the first anchor point of the initial pair of anchor points; and/or an x-coordinate value of a second anchor point of the further pair of anchor points is identical to an x-coordinate value of the second anchor point of the initial pair of anchor points.

In a further implementation form of the first aspect, a y-coordinate value of the first anchor point of the further pair of anchor points is different to a y-coordinate value of the first anchor point of the initial pair of anchor points; and/or a y-coordinate value of the second anchor point of the further pair of anchor points is identical to a y-coordinate value of the second anchor point of the initial pair of anchor points.

In a further implementation form of the first aspect, an x-coordinate value of the first anchor point of the initial pair of anchor points is selected in a range between a predetermined minimum threshold value, and a predetermined center threshold value; and/or an x-coordinate value of the second anchor point of the initial pair of anchor points is selected in a range between the predetermined center threshold value and a predetermined maximum threshold value.

In some embodiments, the predetermined minimum threshold value may be, for example, a brightness value at which human vision cone cells can still perceive color, hereinafter, also referred to as "minCone", and particularly may have a value of 0.15.

Moreover, the predetermined center threshold value may be, for example, a minimum human skin color brightness value of the HDR video frame (hereinafter, also referred to as "midLight"), and particularly may have a value of 0.35. Furthermore, the predetermined maximum threshold value may be, for example, a brightness value of diffuse white (hereinafter, also referred to as "defusingLight") as an upper threshold.

By selecting the initial anchor points as described above, an improved tone mapping curve may be obtained.

In a further implementation form of the first aspect, a y-coordinate value of the first anchor point of the initial pair of anchor points is equal to the x-coordinate value of the first anchor point of the initial pair of anchor points.

In a further implementation form of the first aspect, a y-coordinate value of the second anchor point of the initial pair of anchor points is calculated based on a histogram of brightness values of the HDR video frame.

For example, in some embodiments, the histogram of brightness values of the HDR video frame may be a histogram of pixels between the "minCone" and the "maxSource".

In a further implementation form of the first aspect, the method further comprises calculating a number of pixels having brightness values between the predetermined minimum threshold value and the predetermined maximum threshold value; comparing values of histogram bins of the histogram of brightness values with the calculated number of pixels; and if a value of one or more histogram bins is larger than the calculated number, clipping the pixel brightness values in the one or more histogram bins which are larger than a predetermined maximum display brightness value, and setting a y-coordinate value of the second anchor point to be an average value of the brightness values of all pixels belonging to the one or more histogram bins larger than the calculated number; and if no value of one or more histogram bins is larger than the calculated number, clipping the pixel brightness values of pixels between the predetermined center threshold and the predetermined maximum threshold value, and setting the y-coordinate value of the second anchor point to be an average value of the brightness values of all pixels between the predetermined center threshold value of the HDR video frame and the predetermined maximum threshold value.

In a further implementation form of the first aspect, the method further comprises generating the tone mapping curve based on the one or more curve parameters.

In a further implementation form of the first aspect, the tone mapping curve is given by:

$$L' = m\_a \left( \frac{m\_p \times L^{m\_n}}{(m\_p - 1) \times L^{m\_n} + 1} \right)^{m\_m} + m\_b,$$

wherein L is a brightness of an input pixel of a HDR video frame, m_n is a first value, particularly m_n=1, m_m is a second value, particularly m_m=2.4, and m_b is a determined PQ value, wherein m_p is a brightness control factor and m_a is a scaling factor defining a maximum brightness of an output pixel, and wherein the one or more curve parameters comprise m_p and m_a.

In a further implementation form of the first aspect, the method further comprises receiving the metadata and the HDR video frame.

In a further implementation form of the first aspect, the method further transmitting the one or more curve parameters as further metadata.

In a further implementation form of the first aspect, the method is performed by an encoder and/or by a decoder.

A second aspect of the disclosure provides an encoder for encoding HDR video frames, wherein the encoder is configured to perform the method according to the first aspect and/or any of the implementation forms of the first aspect.

The encoder of the second aspect achieves the advantages and effects described for the method of the first aspect.

A third aspect of the disclosure provides a decoder for decoding HDR video frames, wherein the decoder is configured to perform the method according to the first aspect and/or any of the implementation forms of the first aspect.

The decoder of the third aspect achieves the advantages and effects described for the method of the first aspect.

A fourth aspect of the disclosure provides a system for generating a tone mapping curve, the system comprising an encoder according to the second aspect and/or any of its implementation forms; and a decoder according to the third aspect and/or any of its implementation forms.

A fifth aspect of the present disclosure provides a computer program comprising a program code for performing the method according to the first aspect and/or any of its implementation forms.

A sixth aspect of the present disclosure provides a non-transitory storage medium storing executable program code which, when executed by a processor, causes the method according to the first aspect and/or any of its implementation forms to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which

FIGS. 3A-B illustrate diagrams of exemplary metadata;

DETAILED DESCRIPTION OF EMBODIMENTS

Figure 1:
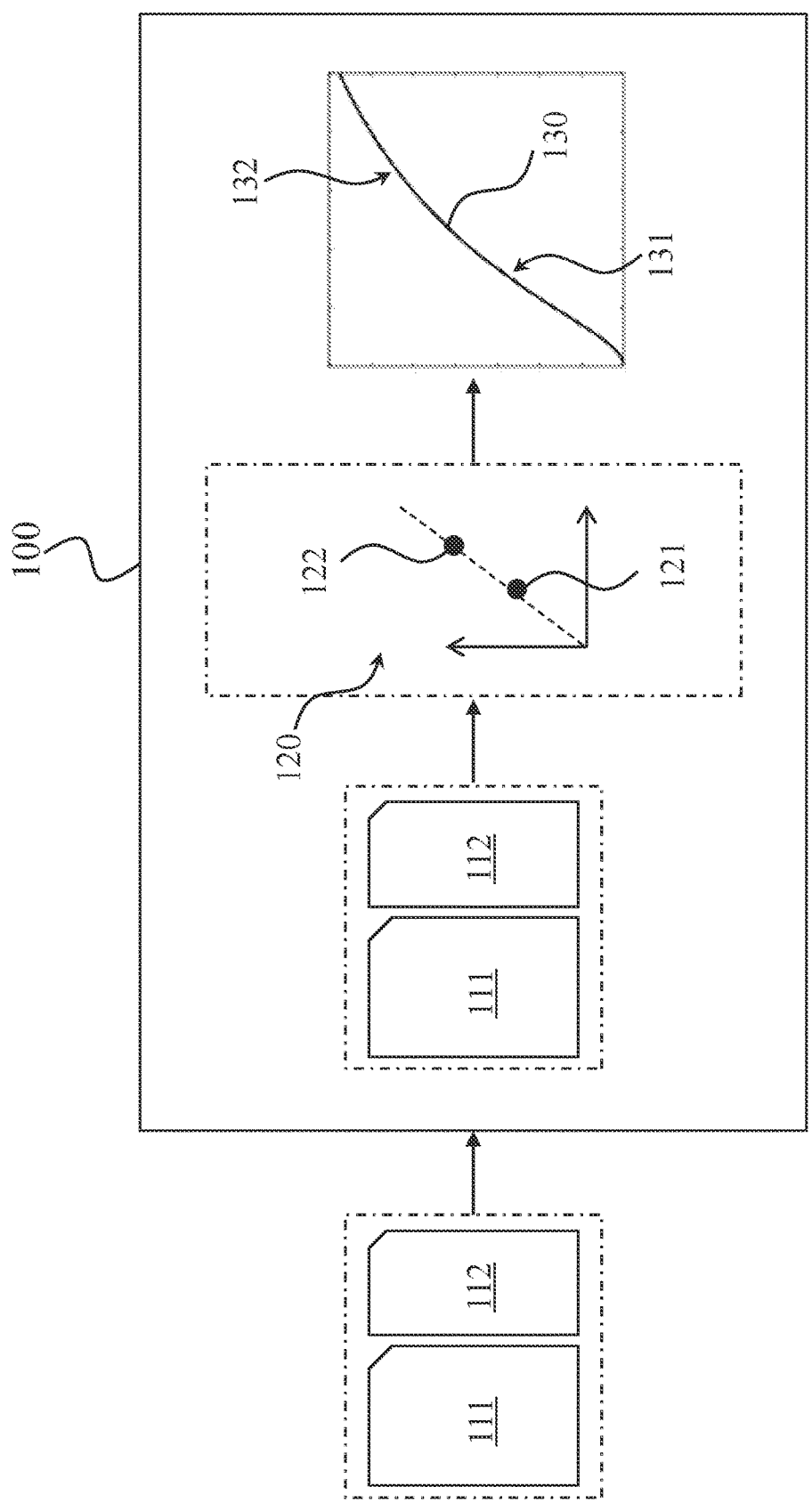
FIG. 1 illustrates a schematic view of a device (in particular, an encoder for encoding HDR video frames, or a decoder for decoding HDR video frames), according to an embodiment of the present disclosure.

FIG. 1 shows a schematic view of a device 100 according to an embodiment of the present disclosure. The device 100 may be an encoder for encoding HDR video frames. Alternatively, the device 100 may be a decoder for decoding HDR video frames. A system may further be formed, comprising at least one such encoder and one such decoder. The device 100 may be configured to perform a method 1100 (see also the schematic diagram shown in FIG. 11) for generating one or more curve parameters 131, 132 of a tone mapping curve 130. For example, the curve parameters 131 and 132 may be the parameters m_a and m_p, respectively, as discussed above. The tone mapping curve 130 can be used to tone-map HDR video frames. Notably, embodiments of the present disclosure may be implemented in block 1201 or 1204 of a pipeline 1200 as shown in FIG. 12. In particular, the method 1100 may be performed in block 1201 or 1204 of the pipeline 1200.

The device 100 is configured to obtain an HDR video frame 111 and metadata 112 associated to the HDR video frame 111. The device 100 may receive the metadata 112 and the HDR video frame 111, e.g., separately. The device 100 may, however, also extract the metadata 112 from the HDR video frame 111. Notably, the metadata 112 may be dynamic metadata, meaning that the metadata 112 may change from one HDR video frame 111 to another HDR video frame 111, and/or from scene to scene of the HDR video.

The device 100 is further configured to obtain a pair of anchor points 120. The pair of anchor points 120 comprises a first anchor point 121 and a second anchor point 122 of the tone mapping curve 130. In particular, the device 100 may obtain the pair of anchor points 120 based on the obtained HDR video frame 111 and/or the obtained metadata 112. The device 100 may also be configured to select the pair of anchor points 120 from a plurality of anchor points 120, for instance, from multiple candidate pairs of anchor points 120. The selection may be based on the pair of anchor points 120 that provides the highest local contrast, if the pair of anchor points 120 is used to approximate the tone mapping curve and a tone mapping operation is performed based on the approximated tone mapping curve.

Further, the device 100 is configured to generate the one or more curve parameters 131, 132 (e.g., the curve parameters m_a and m_p) of the tone mapping curve 130, based on the pair of anchor points 120. The one or more curve parameters 131, 132 may thereby define the tone mapping curve 130

If the device 100 is the decoder, it may further generate the tone mapping curve 130 based on the one or more curve parameters 131, 132 (e.g., the curve parameters m_a and m_p). Further, the device 100 may then perform tone mapping on the HDR video frame 111 using the generated tone mapping curve 130. The decoder or decoding device may comprise a display or may be connected to a display and may output the tone mapped HDR video frame to the display.

Figure 4:
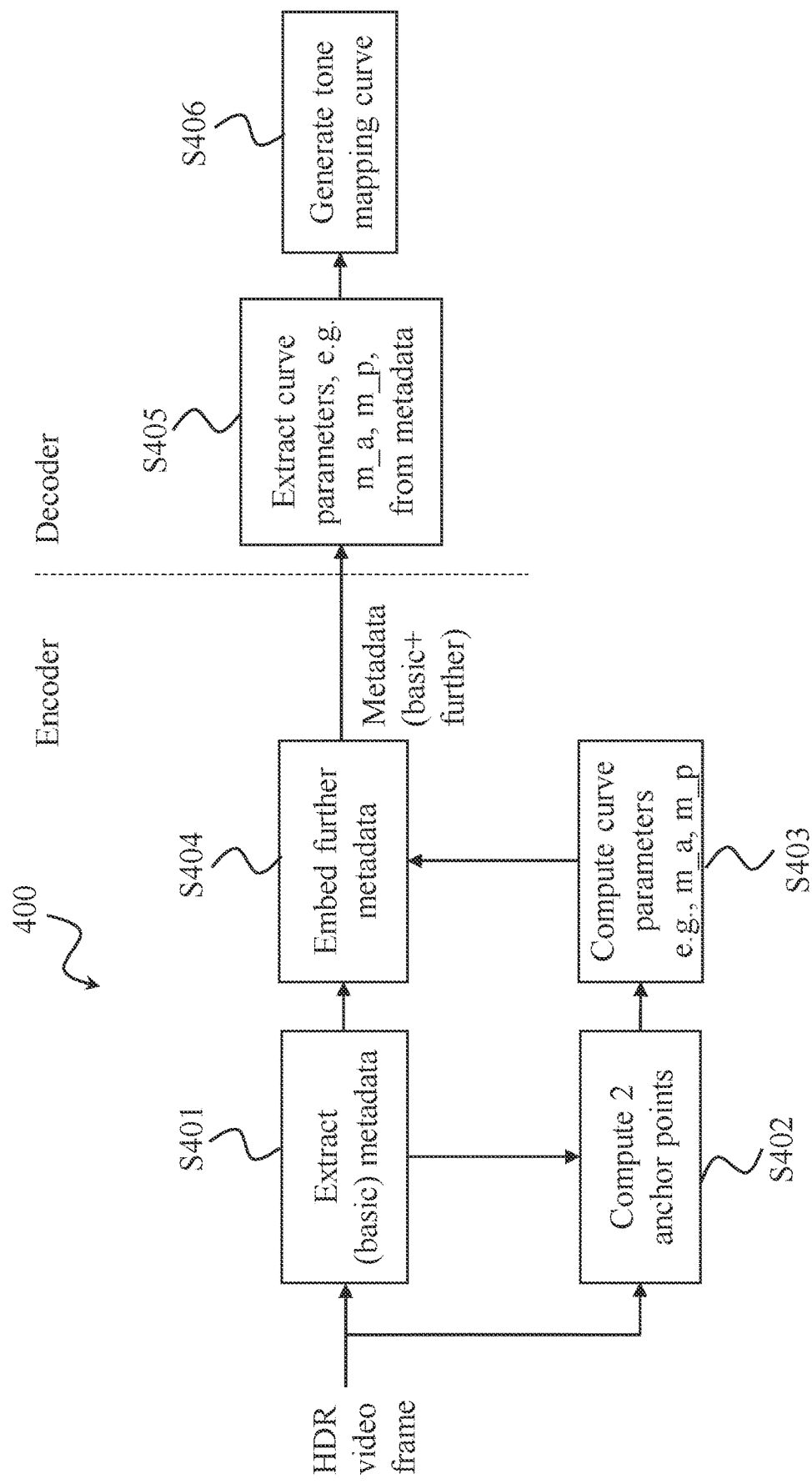
FIG. 4 illustrates a flowchart of a method for generating, by an encoder, the one or more curve parameters of the tone mapping curve, and transmitting the generated curve parameters to the decoder, according to an embodiment of the present disclosure.

If the device 100 is the encoder, it may transmit the one or more curve parameters 131, 132 (e.g., the curve parameters m_a and m_p) as further metadata 322b (see an example in FIGS. 3 and 4, the further metadata may also be referred to as artistic metadata). To this end, the device 100 may use the curve parameters 131, 132 as the further metadata 322b, and may include this further metadata 322b in the obtained metadata 112, to obtain enhanced metadata, and then transmit the enhanced metadata. For example, the transmission may be to the decoder, which may then extract the one or more curve parameters 131, 132 from the further metadata 322b, and may then generate the tone mapping curve 130 based thereon. The generation of the tone mapping curve is typically only required for displaying the HDR video frame. Thus encoders may also generate the tone mapping curve, e.g. in case the encoder or encoding device comprises a display or is connected to a display and output the tone mapped HDR video frame to the display, but may also just determine the one or more curve parameters of a tone mapping curve (e.g. for transmission or storage) but not generate the tone mapping curve or the respective tone mapped HDR video as such.

Notably, the tone mapping curve 130 may be a so-called "phoenix" tone mapping curve described below.

The device 100 (encoder or decoder) may comprise a processing circuitry (not shown in FIG. 1) configured to perform, conduct or initiate the various operations of the device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the device 100 to perform, conduct or initiate the operations or methods described herein.

In particular, the device 100 may comprise a processor for executing a computer program comprising a program code for performing the method 1100, i.e. for controlling the device 100 to perform the above-mentioned steps.

Figure 2C:
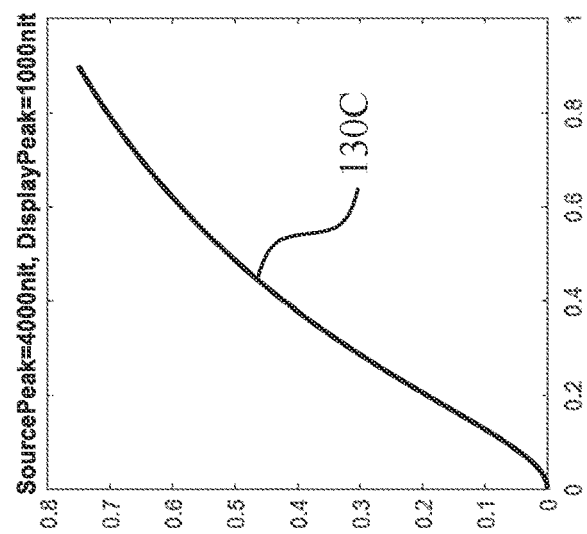
FIGS. 2A-C illustrate diagrams illustrating exemplary tone mapping curves.
Figure 2B:
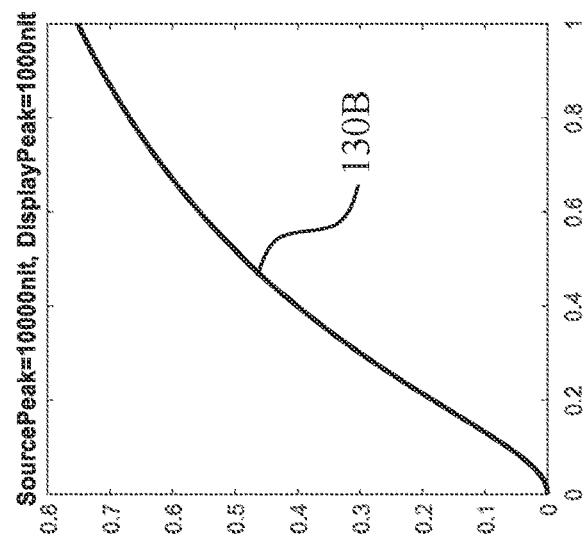
Figure 2A:
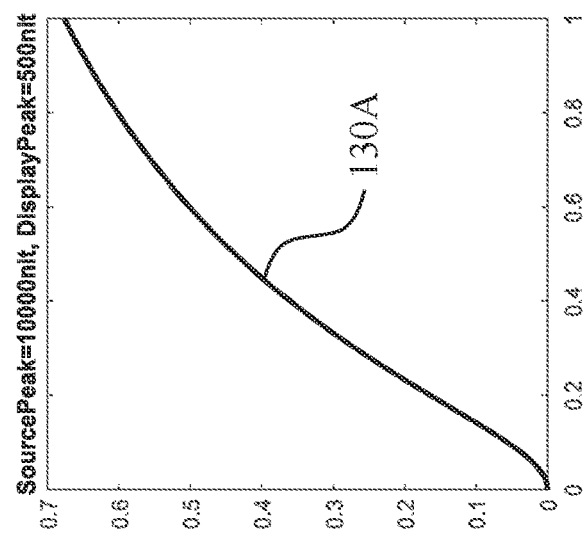

Reference is made to FIGS. 2A, 2B and 2C, which show examples of the tone mapping curve 130 that may be generated by the decoder, in particular illustrating exemplary tone mapping curves 130A, 130B, and 130C in the PQ domain (x-axis or coordinate: input brightness in the PQ domain, y-axis or coordinate: output/tone mapped brightness in the PQ domain).

The obtained tone mapping curve(s) 130 may be referred to as the "phoenix curve", and may be given by:

$$L' = m\_a \times \left( \frac{m\_p \times L^{m\_n}}{(m\_p - 1) \times L^{m\_n} + 1} \right)^{m\_m} + m\_b,$$

as it is described above in the summary part of the present disclosure. This tone mapping curve 130 may be used by the decoder to tone-map the HDR video frame(s) 111.

For the "phoenix curve", the parameter "m_b" may be fixed to minimum display brightness (minimum display brightness value in the PQ domain, or in other words the PQ value of the minimum display brightness), the parameter m_n may be 1, and the parameter m_m may be 2.4. Furthermore, the two remaining variables are the parameters m_a and m_p, which may be or maybe be comprised in the one or more curve parameters 131 and 132 discussed above. That is, the device 100 may be configured to generate the parameters m_a and m_p of the tone mapping curve 130.

Notably, the curve parameter m_p represents the brightness control factor (in particular, a larger value of m_p represents a brighter tone mapping). Further, the curve parameter m_a is the scaling factor that controls the maximum output brightness of an output pixel (obtained by tone mapping using the tone mapping curve 130).

Other embodiments using the "phoenix curve" may use other parameters, e.g. m_m may be in a range from 1 to 5, and m_n may be in a range from 0.5 to 2.

Embodiments may use other non-linear tone-mapping curves (other than the "phoenix curve") and approximate the non-linear ton-mapping curves by piecewise linear curves with two adaptive anchor points to determine an optimum pair of anchor points (e.g. with regard to perceptual quality) of these other non-linear tone mapping curves.

The tone mapping curve 130 may be generated in the PQ domain. In other words, the input L and the output of the tone mapping curve 130 may both refer to PQ values. The input L may be in the range of 0 to 1, wherein a PQ value of 0 is 0 nit in the linear domain, and a PQ value of 1 is 10000 nit in the linear domain. Moreover, the output value may be in the range of 0 to a PQ value equal to or below the maximum display brightness in the PQ domain. The minimum and maximum display brightness depend on the actual display and may vary from display to display. Embodiments of the encoder and/or decoder know or at least assume the minimum and maximum display brightness of the display(s) for which the one or more parameters of the tone mapping curve are determined.

The exemplary tone mapping curves 130A, 130B, and 130C, which are shown in FIG. 2A-C, and which may be generated by the decoder, are particularly generated based on a different maximum input brightness (e.g., related to the HDR video frame 111) and maximum display brightness (e.g., of a display to which the HDR video frame 111 is to be tone-mapped). Moreover, as an example, m_p=5.0. The tone mapping curve 130A may be generated by the decoder based on a maximum input brightness of 10000 nit and a maximum display brightness of 500 nit. Further, the tone mapping curve 130B may be generated by the decoder based on a maximum input brightness of 10000 nit and a maximum display brightness of 1000 nit. Moreover, the tone mapping curve 130C may be generated by the decoder based on a maximum input brightness of 4000 nit and a maximum display brightness of 1000 nit.

Reference is now made to FIG. 3A and FIG. 3B, which show diagrams illustrating exemplary metadata 112. In particular, metadata 112 for a first mode is shown in FIG. 3A, and metadata 112 for a second mode is shown in FIG. 3B. The method 1100 according to embodiments of the present disclosure may be performed in the first mode or in the second mode. Thereby, the encoder and decoder may operate in these different modes. As an example, with reference to the CUVA HDR standard, the first mode is hereinafter referred to as "automatic mode", and the second mode is hereinafter referred to as "artistic mode". In both modes, the one or more curve parameters 131, 132 (e.g., the curve parameters m_a and m_p) may be generated based on the HDR video frame 111 and/or the metadata 112, as described above. Notably, the "artistic mode" does not imply that the generating of the curve parameters 131 and 132 is done manually. Conventionally, in the artistic mode, one or more curve parameters may be manually designed and inserted into the metadata 112. However, according to embodiments of the present disclosure, the curve parameters 131, 132 (e.g., the curve parameters m_a and m_p) may be generated automatically by the device 100 and/or method 1100 in the artistic mode as well. The expression "artistic mode" in this disclosure does thus not imply that a human artist or a colorist is involved in generating the one or more curve parameters 131, 132.

Automatic Mode: Mode Flag Tone_Mapping_Mode=0.

In this first mode, the obtained metadata 112 may comprise so-called "basic metadata" 312 as it is shown in FIG. 3A, for instance, with reference to the CUVA HDR standard. Moreover, the one or more curve parameters 131, 132 (e.g., the curve parameters m_a and m_p) may be computed based on the basic metadata 312 (included in the metadata 112), particularly at the decoder being the device 100. The basic metadata 312 may include typical image statistics, e.g., may include—with respect to the HDR video frame 111—a minimum brightness value, a maximum brightness value, an average brightness value, and/or a variance of brightness values (e.g. of the HDR frame 111). The basic metadata 312 may comprise a minimum set of parameters that may be sufficient to compute the curve parameters 131 and 132 (e.g., the curve parameters m_a and m_p). For example, the basic metadata 312 may include the four parameters as follows (with reference to the CUVA HDR standard):

minimum_maxrgb_pq: minimum of the maxrgb values of all pixels in a frame. Values are in PQ domain.

average_maxrgb_pq: average of the maxrgb values of all pixels in a frame.

variance_maxrgb_pq: the difference between the maxrgb value of the 90$^{th}$ percentile of maxrgb values of all the pixels in a frame and that of 10$^{th}$ percentile of all the maxrgb values in a frame maximum_maxrgb_pq: maximum of the maxrgb values of all pixels in a frame. Values are in PQ domain.

Therein, the maxrgb value of a pixel is the maximum of R, G and B values of a pixel. The values are in the PQ domain. And all the four parameters given above are values in the PQ domain (thus each value name ends with _pq).

These parameters of the basic metadata 312 may be transmitted by the encoder and received by the decoder (e.g. in case both encoder and decoder operate in the automatic mode), and may be used by the decoder as a basis to generate the one or more curve parameters 131, 132, i.e., to first obtain the pair of anchor points 120 based on the basic metadata 312, and then generate the curve parameters 131, 132 based on the pair of anchor points 120 as explained before.

Furthermore, the metadata 112 may optionally comprise color metadata 322a (e.g. color adjustment or weighting factors). In the first mode, the one or more curve parameters 131, 132 (e.g., the curve parameters m_a and m_p) of the tone mapping curve 130 (e.g., the "phoenix" curve) can be computed based on the basic metadata 312 of the metadata 112 and, optionally, based on the color metadata 322a.

Artistic Mode (Mode Flag Tone_Mapping_Mode=1):

In this second mode, the one or more curve parameters 131, 132 (e.g., the curve parameters m_a and m_p) may be determined at the encoder, and may then be added to the metadata 112 (in particular, to the basic metadata 312 and optionally also to the color metadata 322a), particularly as further metadata 322b. The generated curve parameters 131, 132 (e.g., the curve parameters m_a and m_p) may be embedded in the further metadata 322b that is included in the metadata 112. The metadata 112, and thus also the further metadata 322b, may then be provided to the decoder. The decoder (in the artistic mode) may obtain the further metadata (e.g. the one or more curve parameters 131, 132, e.g. the curve parameters m_a and m_p) directly from the bitstream (e.g by parsing the artistic mode metadata directly from the bitstream) and thus does not need to determine the one or more curve parameters 131, 132 from the basic metadata and the HDR video frame. This allows to reduce the complexity and/or processing power at the decoder.

The further metadata 322b may, in particular, be referred to as artistic mode metadata 322b (with reference to the CUVA HDR standard). The further metadata 322b may also comprise cubic spline parameters such as "TH1, TH2, TH3, TH_strength" in addition to the generated tone mapping curve parameters 131, 132 (which are, e.g., the computed "phoenix" curve parameters m_a, m_p). TH1 and TH3 are x-values of the starting and ending point of the cubic spline curve. The y-values are the same as the corresponding points on the phoenix curve. Further, TH2 is the x-value in between. Moreover, TH_strength is the y-value of the cubic spline curve at TH2, which may control the height of the cubic spline curve. In the range of TH1 and TH3, a cubic spline curve may be used which may replace the basic tone mapping curve ("phoenix" curve). Furthermore, one or more cubic spline curves in non-overlapping ranges may be supported.

The decoder may generate the tone mapping curve 130 based on the further metadata 322b. In particular, the decoder may use the one or more curve parameters 131, 132 (e.g., the curve parameters m_a and m_p) included in the further metadata 322b for generating the tone mapping curve 130. For instance, the decoder may extract the one or more curve parameters 131, 132 (e.g., the curve parameters m_a and m_p) from the further metadata 322b. Notably, the decoder could also discard these curve parameters 131, 132 contained in the further metadata 322b, and could calculate new one or more curve parameters 131, 132 based on the basic metadata 312, for instance (e.g. in case the decoder does not support the "artistic mode").

In summary, the difference between the first mode (e.g., automatic mode) and the second mode (e.g., artistic mode) is that in the first mode, the basic metadata 312 (of the metadata 112) is transmitted to the decoder, and the decoder generates the one or more curve parameters 131, 132 based thereon. In the second mode, the one or more curve parameters 131, 132 are computed at the encoder, and are embedded in the metadata 112 as the further metadata 322b, and sent to the decoder.

FIG. 4 shows an embodiment of the present disclosure, wherein the method 1100 is performed at the encoder in the second mode (e.g. artistic mode). In particular, FIG. 4 shows a flowchart of a method 400 performed by the system of the encoder and a decoder (may be a conventional decoder), wherein the encoder generates the one or more curve parameters 131, 132, and transmits the one or more generated curve parameters 131, 132 as the further metadata 322b to the decoder.

In the following, the method 400 is exemplary discussed for the system, wherein some of the steps (i.e., the steps S401-S404) are performed by the encoder, and some of the steps (i.e., the steps S405-S406) are performed by the decoder, without limiting the present disclosure.

At step S401, the encoder obtains the metadata 112 including the basic metadata 312. For example, the encoder 100 may obtain the HDR frame 111 (of an HDR video source) and may extract the metadata 112, in particular the basic metadata 312, from the HDR video frame 111.

For example, the encoder may thereby obtain one or more of the following parameters: a maximum display brightness, MaxDisplay(PQ value); a minimum display brightness, MinDisplay(PQ value); an RGB domain pixel buffer f[Nframe][3] of the current HDR video frame 111. The f[Nframe][3] may be a 2-d array, wherein Nframe is the number of pixels in the current HDR video frame 111, and 3 represents the 3 color channels, i.e. R, G, B. For instance, f[11][0] may be the R value of the 12$^{th}$ pixel in raster scan order, f[11][1] is G, and f[11][2] is B.

At step S402, the encoder obtains the pair of anchor points 120 as described above (a more detailed description of how the pair of anchor points 120 may be obtained/selected is given further below). For example, the encoder may compute two anchor points including the first anchor point 121 and the second anchor point 122 described above. As will be explained below, the encoder may select a pair of anchor points 120, may fine tune the pair of anchor points 120 (e.g., based on tone-mapping producing the highest local contrast).

At step S403, the encoder generates the one or more curve parameters 131 and 132 (e.g., the curve parameters m_a and m_p) of the tone mapping curve 130, based on the pair of anchor points 120. For example, the encoder may compute the curve parameters m_a and m_p described above for the phoenix curve, based on the pair of anchor points 120.

In another example, the encoder may generate a curve parameter set $P_{tone\_mapping}$, including one or more of the following parameters (parameters as described above): m_p, m_m, m_n, m_b, K1, K2, K3. However, the m_p and m_a may be non-trival, and the other parameters may all be preset (m_m: 2.4; m_n: 1; K1, K2, K3 are all 1).

At step S404, the encoder obtains/generates enhanced metadata 112 including the further metadata 322b. For example, the encoder may embed the further metadata 322b (e.g., here it is called artistic mode metadata) in the metadata 112, i.e., adds it to the basic metadata 312. The further metadata 322b comprises the one or more curve parameters 131, 132 (e.g., the curve parameters m_a and m_p). Moreover, the encoder may transmit the enhanced metadata 112, including the basic metadata 312 and the further metadata 322b, to the decoder.

At step S405, the decoder obtains the curve parameters 131, 132. For example, the decoder may extract the one or more curve parameters 131, 132 (e.g. the parameters m_a and m_p) from the obtained enhanced metadata 112, particularly from the further metadata 322b.

At step S406, the decoder generates the tone mapping curve 130. For example, the decoder may generate the tone mapping curve 130 based on the curve parameters 131, 132 (obtained in step S405). For instance, the decoder may generate a phoenix curve based on m_a and m_p as the one or more curve parameters 131, 132.

Figure 5:
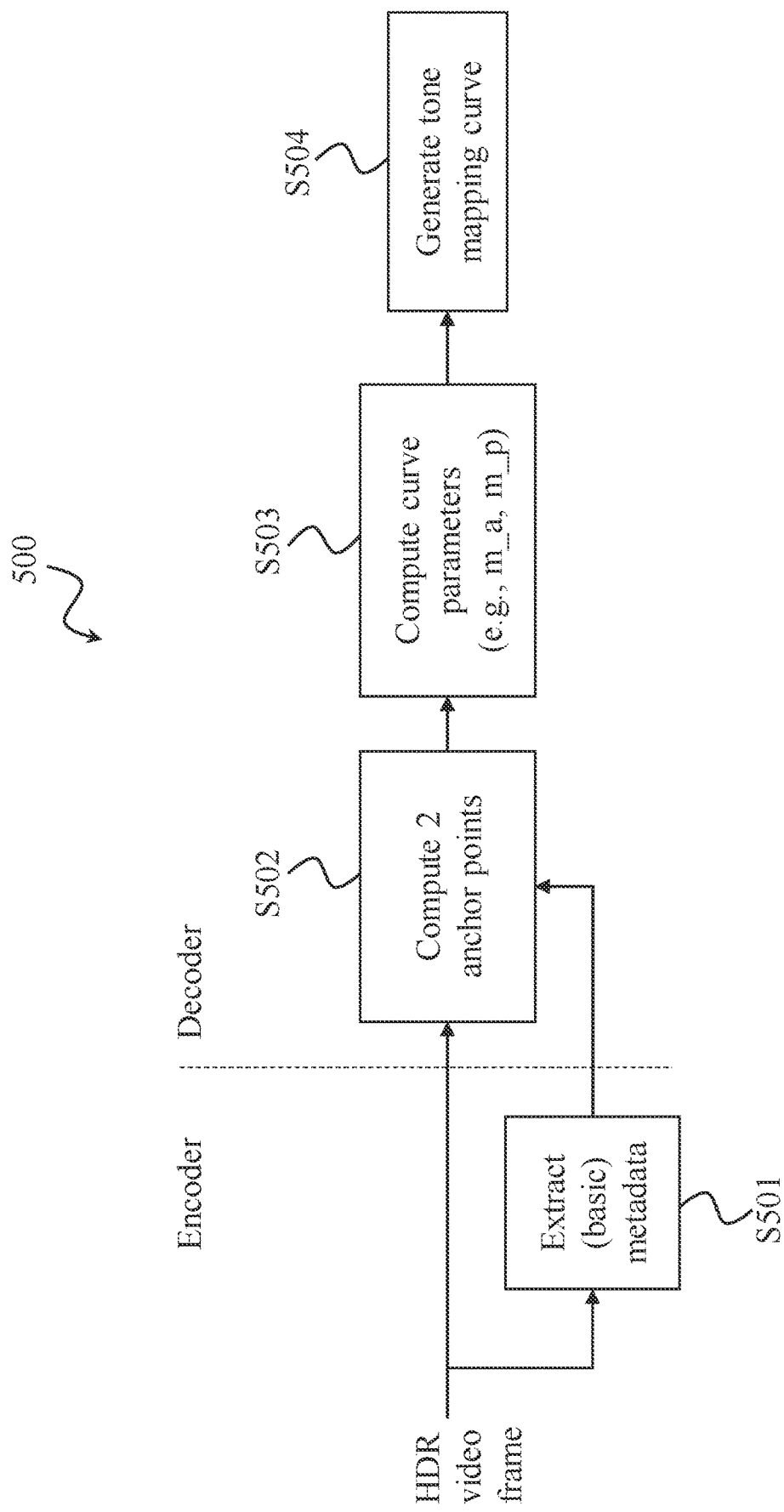
FIG. 5 illustrates a flowchart of a method for generating, by a decoder, the one or more curve parameters of the tone mapping curve, according to an embodiment of the present disclosure.

FIG. 5 shows another embodiment of the present disclosure, wherein the method 1100 is performed at the decoder in the first mode (e.g. automatic mode). In particular, FIG. 5 shows a flowchart of a method 500 performed by the system of an encoder (may be a conventional encoder) and the decoder, wherein the decoder generates the one or more curve parameters 131, 132 (e.g., the curve parameters m_a and m_p).

In the following, the method 500 is exemplary discussed for discussed for the system, wherein step S501 is performed by the encoder, and the steps S502-S504 are performed by the decoder, without limiting the present disclosure.

At step S501, the encoder obtains metadata 112. For example, the encoder may obtain an HDR video frame 111 (e.g., from an HDR video source), and may extract the metadata 112, in particular, the basic metadata 312, from the HDR video frame 111. The encoder may then provide the metadata 112 and the HDR video frame 111 to the decoder. That is, the decoder may receive the metadata 112 and the HDR video frame 111.

At step S502, the decoder obtains a pair of anchor points 120. For example, the decoder may obtain the pair of anchor points 120 based on the received HDR video frame 111 and/or the basic metadata 312. The pair of anchor points 120 may include the first anchor point 121 and the second anchor point 122. As will be explained below, the encoder may select a pair of anchor points 120, may fine tune the pair of anchor points 120 (e.g., based on tone-mapping producing the highest local contrast).

At step S503, the decoder generates the one or more curve parameters 131 and 132 (e.g., the curve parameters m_a and m_p) of the tone mapping curve 130 based on the pair of anchor points 120. For example, the decoder 200 may compute the curve parameters m_a and m_p of the phoenix curve from the pair of anchor points 120.

At step S504, the decoder may generate the tone mapping curve 130. For example, the decoder may generate the tone mapping curve 130 based on the obtained curve parameters m_a and m_p, i.e., the decoder may generate a phoenix curve as described above.

It may be possible, regarding FIG. 4 compared to FIG. 5, that the HDR video frame 111 at the decoder is different from the HDR video frame 111 at the encoder, e.g., because of video compression. At the encoder side, the method 1100 may be performed before encoding, and thus the original HDR video frame 111 may be processed. Performing the method 1100 at the encoder allows to reduce the complexity (performed only once at the encoder and not at each decoder and may also provide better parameters, and thus better quality, because it may use the original HDR video frame for determining the one or more curve parameters). At the decoder, however, it may be the encoded and compressed HDR video frame 111 that may be decoded and processed by the method 1100.

Figure 6:
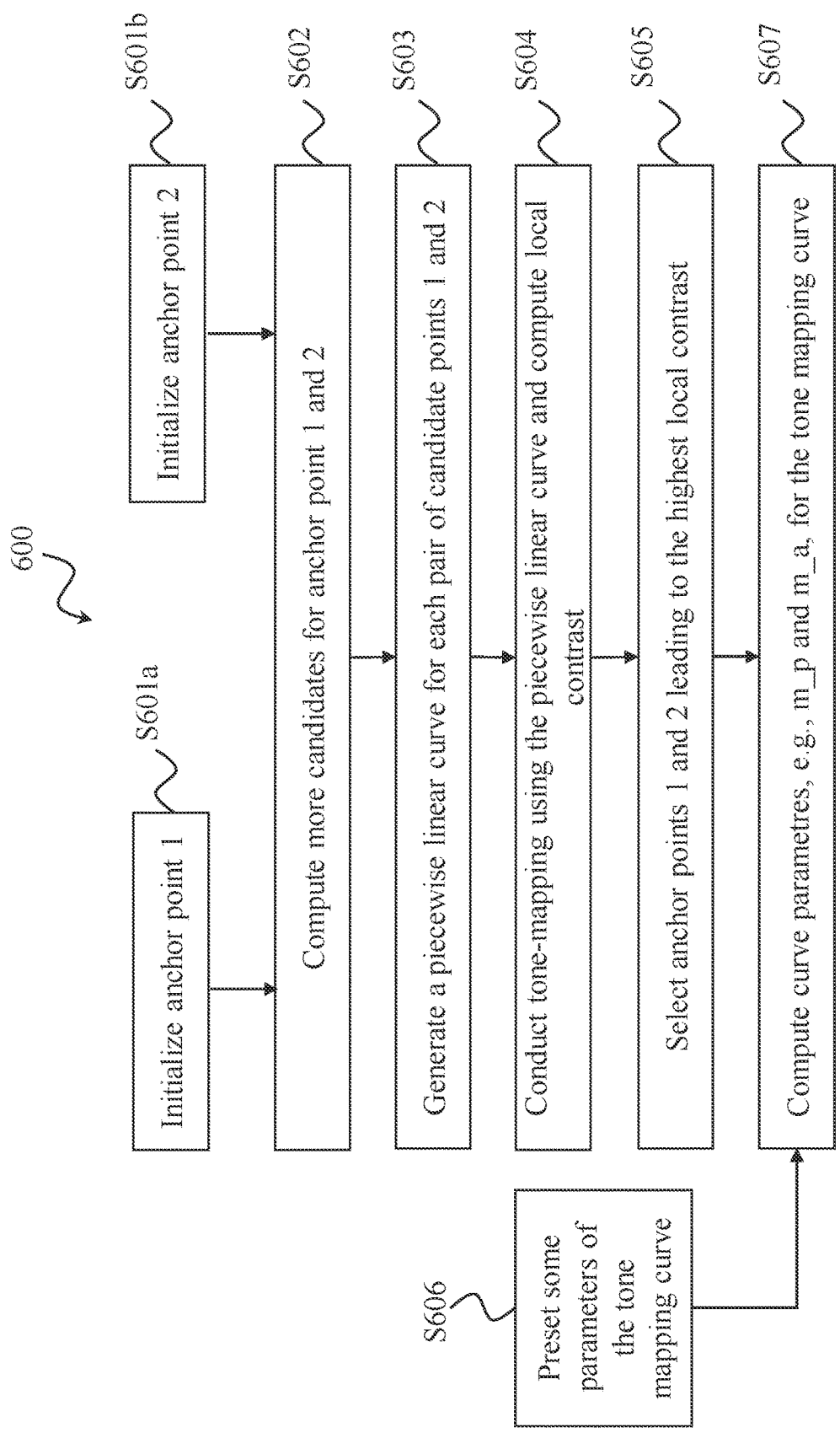
FIG. 6 illustrates a flowchart of a method for selecting a pair of anchor points for generating the one or more curve parameters of the tone mapping curve, according to an embodiment of the present disclosure.

Reference is now made to FIG. 6, which shows a flowchart of an exemplary method 600 for determining the pair of anchor points 120 for generating the one or more curve parameters 131, 132 (e.g., the curve parameters m_a and m_p), as described above. In particular, the method 600 describes an example of selecting a pair of anchor points 120, and fine tuning the pair of anchor points 120 (e.g., based on tone-mapping producing the highest local contrast), as also described above. The pair of anchor points 120 for generating the one or more curve parameters 131, 132 (e.g., the curve parameters m_a and m_p) is selected from a plurality of pairs of anchor points 120. Generally speaking, the method 600 comprises obtaining a plurality of pairs of anchor points 120 (by the device 100), generating a piecewise linear curve 901 for each pair of the plurality of pairs of anchor points 120, performing tone mapping on the HDR video frame 111 based on each of the piecewise linear curves 901 to obtain a plurality of tone-mapped HDR video frames, and selecting the pair of anchor points 120 for generating the one or more curve parameters 131, 132 (e.g., the curve parameters m_a and m_p) from the plurality of pairs of anchor points 120 based on the plurality of tone-mapped HDR video frames.

The method 600 may be performed by the encoder or the decoder. In the following, the method 600 is exemplary discussed as a method performed by generally the device 100 (as shown e.g., in FIG. 1), without limiting the present disclosure.

At step S601a and S601b, the device 100 obtains an initial pair of anchor points 120, in particular an initial anchor point 1 (i.e., initial first anchor point 121) and a an initial anchor point 2 (i.e., initial second anchor point 122).

Figure 7:
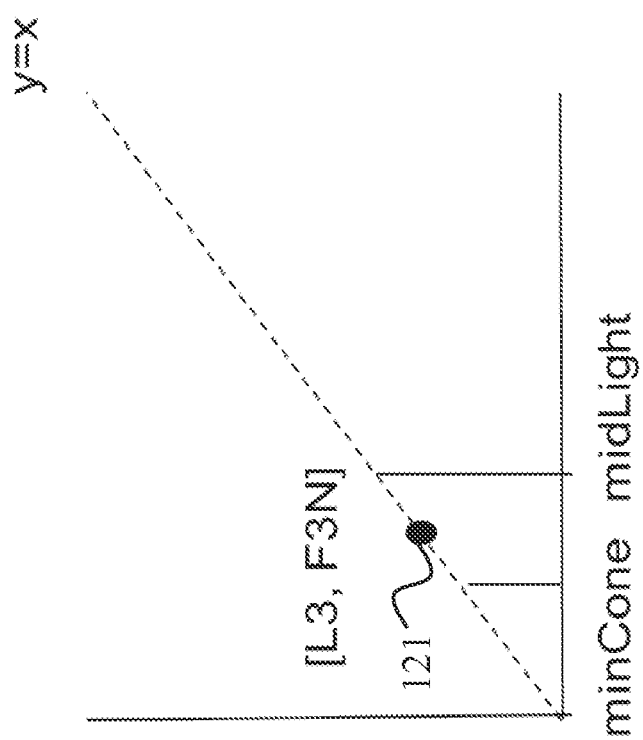
FIG. 7 illustrates a diagram of an example of obtaining an initial first anchor point, according to an embodiment of the present disclosure.

FIG. 7 shows a diagram illustrating an example of an obtained initial first anchor point 121.

As an example, a y-coordinate value of the initial first anchor point 121 may be equal to the x-coordinate value of the initial first anchor point 121. The x-coordinate value of the first initial anchor point 121 may be selected in a range between a predetermined minimum threshold value, and a predetermined center threshold value.

In particular, the initial first anchor point 121 may be denoted as (L3, F3N), L3 being the x-coordinate value and F3N being the y-coordinate value of the initial first anchor point. Thereby, In one embodiment, L3 may equal the value of Average_dark (PQ value) in the metadata 112, and F3N may equal the value of Perceptual_dark (PQ value) of the target display. In another embodiment, L3 and F3N values are equal, and may be computed using the following equation:

$$L3 = F3N = \frac{\sum_{i=0}^{N_{frame}} f[i]}{N_{frame}}, \text{ for all } f[i] \text{ in } (minCone, midLight)$$

where f[i] is the maximum of f[i][0], f[i][1] and f[i][2], and in other words the maximum of the R, G, B values of the ith pixel or maxRGB value of the ith pixel. Herein, only f[i] values that are between minCone (i.e., the minimum threshold value) and midLight (i.e., the center threshold value) are considered, and the Nframe means the number of pixels with a maxRGB value between minCone and midLight. Furthermore, the value of minCone may be 0.15, i.e., the PQ value of the lower threshold of the brightness range, in which cone cell of human visual system can perceive color. Moreover, the value of midLight may be 0.35, which means the lower threshold of skin color brightness range recommended in the standard of BT2408.

Embodiments may be configured to use predetermined threshold values representing or considering characteristics of the human vision system or human visual perception. For example, the minimum threshold may be set to a threshold brightness level below which cone cells of the human vision system perceive no more color (e.g. minCone) and thus provide less information. Thus, the first anchor point is selected to be larger than the minimum threshold, e.g. larger than minCone. The center threshold and the maximum threshold may be selected to relate to color perception. For example the center threshold may be set to a value representative of or for human skin color, e.g. to a lower threshold of human skin color (e.g. midLight), and the maximum threshold may be set to a value representative to the color of white (e.g. defusingLight). Thus, the second anchor point is selected between these two values so that the skin color and the white color are better controlled by the second anchor point. In an embodiment the minimum threshold may be set to minCone, the center threshold may be set to midLight and the maximum threshold may be set to defusingLight. Other embodiments may use only one or more of the above thresholds and/or further threshold values.

Figure 8:
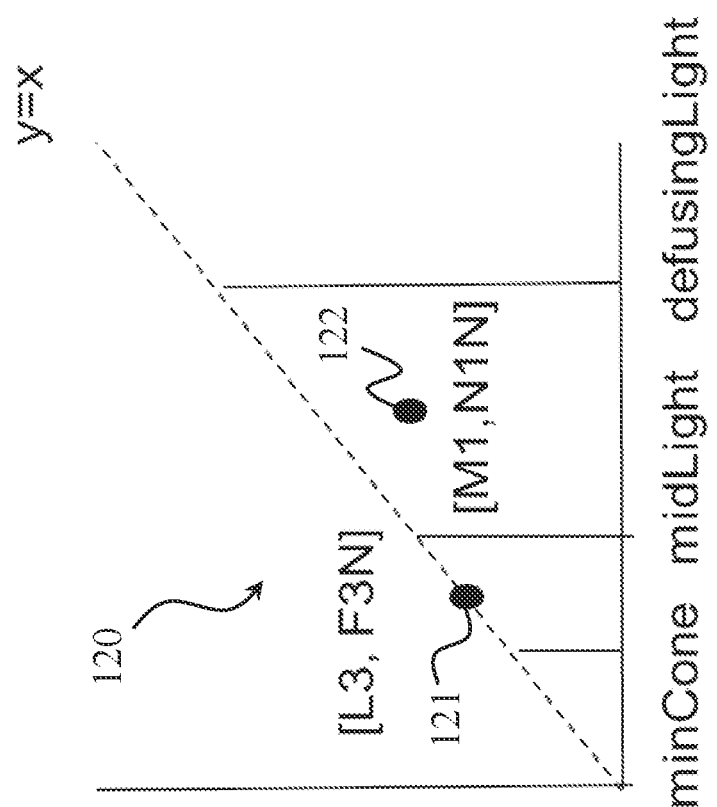
FIG. 8 illustrates a diagram of an example of obtaining an initial second anchor point, e.g., an initial pair of anchor points, according to an embodiment of the present disclosure.

FIG. 8 shows a diagram illustrating an example of the obtained initial pair of anchor points 120, comprising the initial first anchor point 121 and an initial second anchor point 122. An x-coordinate value of the initial second anchor point 122 may be selected in a range between the predetermined center threshold value and a predetermined maximum threshold value.

In particular, the initial second anchor point 122 may be denoted as [M1, N1N], M1 being the x-coordinate value and N1N being the y-coordinate value of the initial second anchor point. M1 may equal to average_midLight (PQ value) in the metadata 112, and may be computed by averaging all maxRGB values in the range of (midLight (i.e., the center threshold value), and defusingLight (i.e., the maximum threshold value). Further, defusingLight=midLight+(MaxSource−midLight)*ratio, wherein the ratio may be preset to 4/6. Furthermore, the MaxSource may be the maximum of maxRGB values of the source image (HDR video frame 111). MinSource may be the minimum of maxRGB values of the source image (HDR video frame 111). The computation of value of defusingLight may be based on the lower threshold of defuse white range, as e.g., recommended in the standard of BT2048.

Further, a y-coordinate value of the initial second anchor point 122 may be calculated based on a histogram of brightness values of the HDR video frame 111.

In particular, the N1N may be the value of Perceptual_midLight (PQ value) and may be computed based on the histogram of all maxRGB values in the range of (midLight, defusingLight), which specifically may be computed as follows.

Firstly, the device 100 may compute the histogram of maxRGB values in the range of (minCone, MaxSource), and a histogram bin size may be set to (MaxSource−minCone)*V/U, wherein U and V are positive integers, U is recommended to be 6, and V is smaller than or equal to 3. Further, the device 100 may compute the number of pixels with maxRGB value in the range of (midLight, defusingLight), and names it Half_Num. Moreover, if the number of samples of a histogram bin is larger than Half_Num, this bin is referred to as a HISA bin.

Herein, HISA bins represent the peaky part of the histogram. In other words, HISA bins contains a larger portion of the pixels than other bins. Therefore, if a HISA bin exists, it is more important than other bins, because the HISA bin contains significantly more pixels. Therefore, the anchor point calculation is based on pixels in the HISA bins. If no HISA bin exists, this means the histogram is flat, and all bins contain a similar number of pixels and no bin is more important than the others. In this instance, the computation of anchor point 2 is not oriented for a specific histogram bin, but based on all pixels between midLight and defusingLight.

Secondly, the device 100 may compute N1N based on HISA bins. If one or more HISA bins exist, as follows:

$$N1N = \frac{\sum_{i=0}^{N_{frame}} q1(i)}{N_{frame}},$$

for all $f[i]$ in ($midLight$, $defusingLight$ and in $HISA$ bins)

and, $$q1(i) = \begin{cases} MaxDisplay & f[i] \geq MaxDisplay \\ f(i) & other \end{cases}$$

However, if no HISA bin exists, the system 300 computes N1N as follows:

$$N1N = \frac{\sum_{i=0}^{N_{frame}} q2(i)}{N_{frame}}, \text{ for all } f[i] \text{ in } (midLight, defusingLightH)$$

and, $$q2(i) = \begin{cases} MaxDisplay & f(i) \geq MaxDisplay \\ f(i) & other \end{cases}$$

where the difusingLightH=midLight+(MaxSource−midLight)*ratioH, and ratioH is recommended to be 5/6.

Generally, in an embodiment, the device 100 may calculate a number of pixels having brightness values between the predetermined minimum threshold value and the predetermined maximum threshold value. Further, the device 100 may compare values of histogram bins of the histogram of brightness values with the calculated number of pixels. Then, if a value of one or more histogram bins is larger than the calculated number, clipping the pixel brightness values in the one or more histogram bins which are larger than a predetermined maximum display brightness value, and setting a y-coordinate value of the second anchor point to be an average value of the brightness values of all pixels belonging to the one or more histogram bins larger than the calculated number. And, if no value of one or more histogram bins is larger than the calculated number, clipping the pixel brightness values of pixels between the predetermined center threshold and the predetermined maximum threshold value, and setting the y-coordinate value of the second anchor point to be an average value of the brightness values of all pixels between the predetermined center threshold value of the HDR video frame 111 and the predetermined maximum threshold value.

At step S602, the device 100 computes one or more further candidates for the first anchor point 121 and the second anchor point 122, i.e. one or more further pairs of anchor points 120. In particular, the device 100 may obtain the one or more further pairs of anchor points 120 based on the initial pair of anchor points 120.

For example, the device 100 may obtain further candidates for the second anchor point 122 denoted as (M1, N1N−M1*MaxDisplay*E/(MaxSource*10)), and may obtain further candidates for the first anchor point 121 donated as (L3, F3N*MaxDisplay*F/(MaxSource*10). The device 100 may select different values of E and F to obtain more candidate pairs of anchor points 120. A value range for E may be between [1, 20], and for F may be between [1, 10].

When selecting the further anchor points 121, 122 (by the device 100), an x-coordinate value of a first anchor point 121 of a further pair of anchor points 120 may be identical to an x-coordinate value of the initial first anchor point 121, and/or an x-coordinate value of a second anchor point 122 of the further pair of anchor points 120 may be identical to an x-coordinate value of the initial second anchor point 122 of the initial pair of anchor points.

Further, a y-coordinate value of the first anchor point 121 of the further pair of anchor points 120 may be different to a y-coordinate value of the initial first anchor point 121, and/or a y-coordinate value of the second anchor point 122 of the further pair of anchor points 120 may be identical to a y-coordinate value of the initial second anchor point 122.

Figure 9:
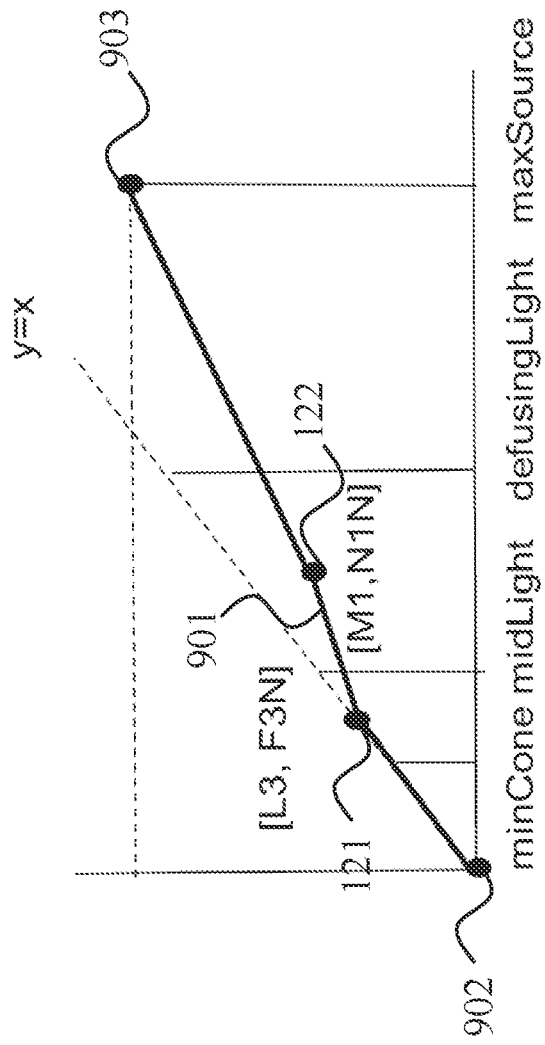
FIG. 9 illustrates a diagram of an example of a generated piecewise linear curve for a pair of anchor points, according to an embodiment of the present disclosure.

At step S603, the device 100 generates a piecewise linear curves 901 for each pair of anchor points 120, i.e. for each of the plurality of pairs of anchor points 120, including the initial pair of anchor points 120 and the one or more further pairs of anchor points 120. FIG. 9 shows in this respect a diagram illustrating exemplary a generated piecewise linear curve 901 for a pair of anchor points 120.

Thereby, the piecewise linear curve 901 of each pair of anchor points 120 connects a predetermined minimum anchor point 902 with the respective first anchor point 121, the respective first anchor point 121 with the respective second anchor point 122, and the respective second anchor point 122 with a predetermined maximum anchor point 902.

For example, the device 100 may select a pair of candidate anchor points 121, 122 together with the (minSource, minDisplay), i.e. the minimum anchor point 902, and the (maxSource, maxDisplay), i.e. the maximum anchor point 902, to generate a piecewise linear curve 901 for this pair of anchor points 120. This piecewise linear curve 901 may be used as a candidate to approximate the final tone mapping curve 130.

At step S604, the device 100 conducts tone-mapping using the piecewise linear curve 901, and compute local contrasts. Generally speaking, the device 100 may perform tone mapping on the HDR video frame 111 based on each of the piecewise linear curves 901 to obtain a plurality of tone-mapped HDR video frames. The device 100 may also determine for each of the plurality of tone-mapped HDR video frames a local contrast to obtain a plurality of local contrasts.

For example, different values of E and F may lead to different pairs of anchor points 120, and thus, to different piecewise linear curves 901. Moreover, tone mapping may be conducted for the current HDR video frame 11 using each piecewise linear curve 901, and the local contrast is calculated. The local contrast may be computed for the tone-mapped HDR video frame as follows:

1) The device 100 may divide the tone-mapped HDR video frame into smaller patches. Patch size may be 8×8, 16×16, 32×32 or 64×64.
2) The device 100 may compute, for each image patch, the maximum maxRGB values of all pixels, and minimum maxRGB of all pixels, and a local contrast is the difference between maximum and minimum values.
3) The device 100 may average the local contrast of all patches, and may select it as the local contrast value for the tone-mapped HDR video frame.

At step S605, the device 100 may then select the pair of anchor points 120 for generating the one or more curve parameters 131, 132 (e.g., the curve parameters m_a and m_p) from the plurality of pairs of anchor points 120 based on the plurality of tone-mapped HDR video frames, in particular, based on the plurality of local contrasts. For instance, the device 100 may select the pair of anchor points 120 leading to the highest local contrast.

For example, the device 100 may select separately the value E and value F that lead to the maximum local contrast for the tone-mapped HDR video frames, and calculate the final anchor points 121 and 122, i.e. [L3, F3], [M1, N1].

At step S606, the device 100 may obtain some preset parameters of the tone mapping curve 130.

At step S607, the device 100 computes the curve parameters 131, 132, e.g. it may compute the parameters m_p and m_a, for the tone mapping curve 130.

For example, the device 100 may use the selected pair of anchor points [L3, F3] and [M1, N1], and the following equation to compute m_a and m_p:

$$m\_p = 1 + \left(\left((N1/F3)^{\frac{1}{m\_m}} \times L3 - M1\right) / \left(M1 \times L3 \times \left(1 - (N1/F3)^{\frac{1}{m\_m}}\right)\right)\right)$$

$$m\_a = \frac{N1}{(m\_p \times M1/((m\_p - 1) \times M1 + 1))^{m\_m}}$$

wherein m_m may be preset to 2.4.

Furthermore, the device 100 may generate the tone mapping curve 130. An example of a tone mapping curve 130 based on the one or more curve parameters 131, 132. Optionally, the device 100 may also send the preset parameters of the tone mapping curve 130 in addition.

Figure 10:
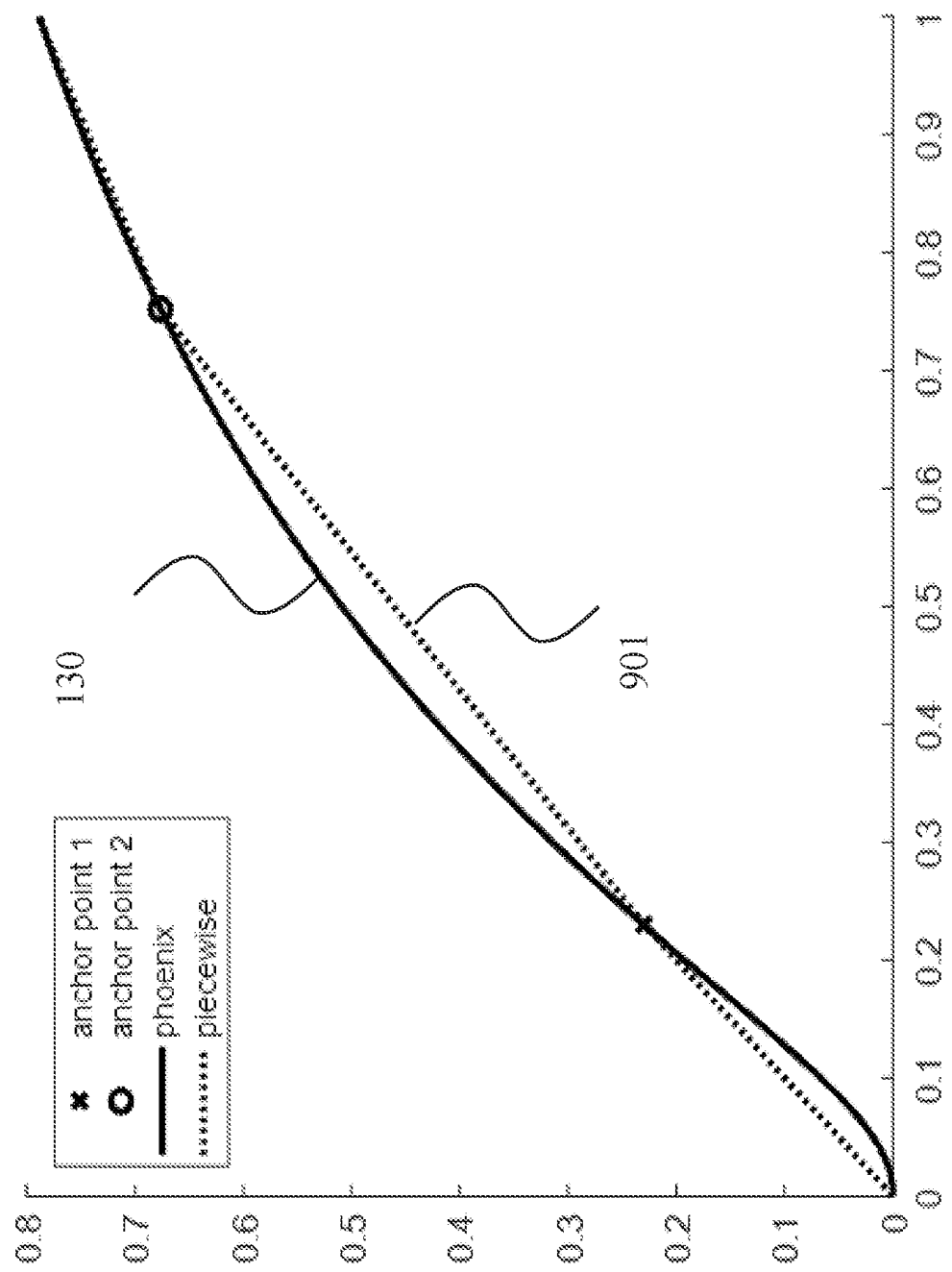
FIG. 10 illustrates a diagram of an example of a tone mapping curve generated based on curve parameters generated based on a piecewise linear curve (shown in comparison), according to an embodiment of the present disclosure.

FIG. 10 shows, for comparison, a tone mapping curve 130 generated based on the one or more generated curve parameters 131, 132, and shows a piecewise linear curve 901 generated based on a selected pair of anchor points 121, from which piecewise linear curve 901 the one or more curve parameters 131, 132 were generated.

Figure 11:
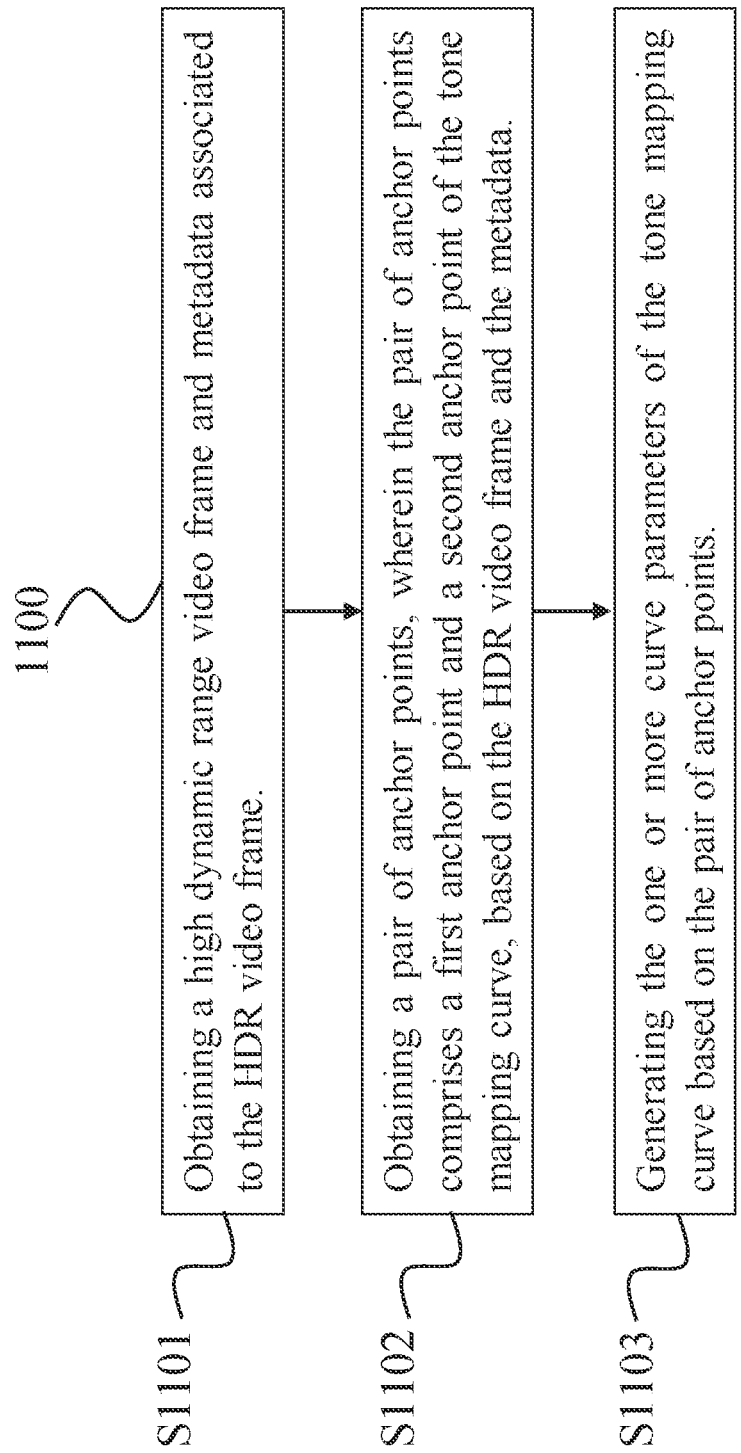
FIG. 11 illustrates a flowchart of a method for determining one or more curve parameters, according to an embodiment of the present disclosure.
Figure 12:
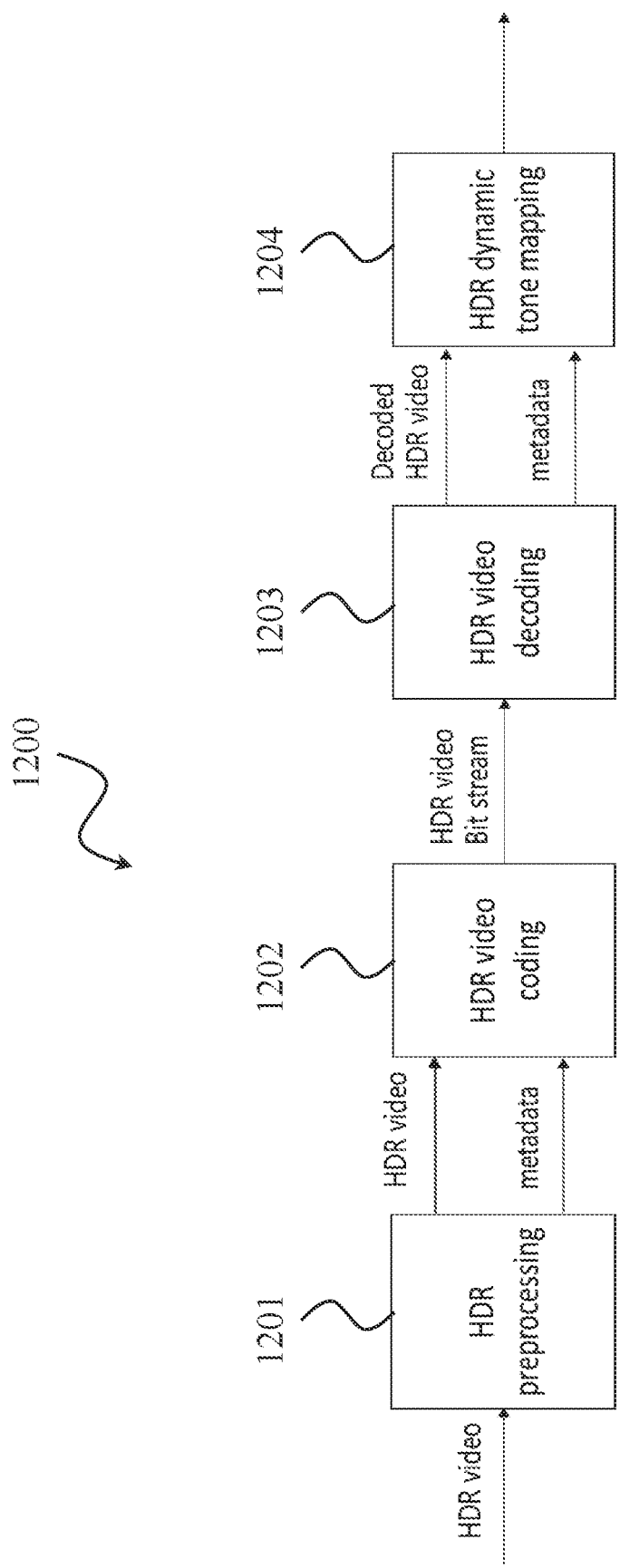
FIG. 12 illustrates an example of a pipeline of an HDR dynamic tone mapping process.

FIG. 11 shows a flowchart of the method 1100 for determining the one or more curve parameters 131, 132, according to an embodiment of the present disclosure. The method 1100 may be performed by the device 100, i.e., the encoder or the decoder as described above.

The method 1100 comprises a step S1101 of obtaining an HDR video frame 111 and metadata 112 associated to the HDR video frame 111.

The method 1100 further comprises a step S1102 of obtaining a pair of anchor points 120, wherein the pair of anchor points 120 comprises a first anchor point 121 and a second anchor point 122 of the tone mapping curve 130, based on the HDR video frame 111 and the metadata 112.

The method 1100 further comprises a step S1103 of generating the one or more curve parameters 131, 132 of the tone mapping curve 130 based on the pair of anchor points 120. The one or more curve parameters 131, 132 may be, for example, the curve parameters m_a and m_p, respectively.

FIG. 12 shows an example of a signal processing pipeline 1200 of an HDR dynamic tone mapping process. The input of the system is the HDR video, e.g. a HDR video frame of the HDR video. In general, this HDR video may be the output of the post-production stage, in which a colorist has edited the video using a color grading system for better quality or for certain artistic intent. The HDR video is of high peak brightness, and could be often 1000 nit, or 2000 nit, and in the near future 4000 nit or 10000 nit. Moreover, the pixel values of the video are in the PQ domain.

In the HDR preprocessing block 1201, the HDR video remains the same as the input. However, metadata is computed. Further, in the HDR video coding block 1202, the HDR video is compressed, e.g. by a video codec, e.g. a video codec according to H.265 or any other video standard (national, international or proprietary). Moreover, the metadata is embedded in the headers of the video stream, which is sent from the encoder to the decoder (or stored on a storage medium for later retrieval by a decoder). In the HDR video decoding block 1203, the decoder receives the HDR video bitstream, decodes the compressed video, and extracts the metadata from the headers.

Furthermore, in the HDR dynamic tone mapping block 1204, a tone mapping is conducted, to adapt the HDR video to the display capacity.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A method for determining one or more curve parameters of a tone mapping curve, the method comprising:
obtaining a high dynamic range (HDR) video frame and metadata associated to the HDR video frame;
obtaining a pair of anchor points, wherein the pair of anchor points comprises a first anchor point and a second anchor point of the tone mapping curve, based on the HDR video frame and the metadata; and
generating the one or more curve parameters of the tone mapping curve based on the pair of anchor points, wherein the tone mapping curve comprises:

$$L'' = m\_a((m\_p \times L^{\hat{}}(m\_n))/((m\_p-1) \times L^{\hat{}}(m\_n)+1))^{\hat{}}(m\_m) + m\_b,$$

wherein L is a brightness of an input pixel of a HDR video frame, m_n is a first value, particularly m_n=1, m_m is a second value, particularly m_m=2.4, and m_b is a determined perception quantization, PQ, value, wherein m_p is a brightness control factor and m_a is a scaling factor defining a maximum brightness of an output pixel, and wherein the one or more curve parameters comprise m_p and m_a.

2. The method of claim 1, wherein the obtaining a pair of anchor points comprises:
obtaining a plurality of pairs of anchor points;
generating a piecewise linear curve for each pair of the plurality of pairs of anchor points;
performing tone mapping on the HDR video frame based on each of the piecewise linear curves to obtain a plurality of tone-mapped HDR video frames; and
selecting the pair of anchor points for generating the one or more curve parameters from the plurality of pairs of anchor points based on the plurality of tone mapped HDR video frames.

3. The method of claim 2, wherein the piecewise linear curve of each pair of anchor points connects a predetermined minimum anchor point with the respective first anchor point, the respective first anchor point with the respective second anchor point, and the respective second anchor point with a predetermined maximum anchor point.

4. The method of claim 2, wherein the selecting the pair of anchor points for generating the one or more curve parameters comprises:
determining for each of the plurality of tone-mapped HDR video frames a local contrast to obtain a plurality of local contrasts; and
selecting the pair of anchor points for generating the one or more curve parameters from the plurality of pairs of anchor points based on the plurality of local contrasts.

5. The method of claim 2, wherein the obtaining a plurality of pairs of anchor points comprises:
obtaining an initial pair of anchor points; and
obtaining further pairs of anchor points based on the initial pair of anchor points.

6. The method of claim 5, wherein:
an x-coordinate value of a first anchor point of a further pair of anchor points is identical to an x-coordinate value of the first anchor point of the initial pair of anchor points; or
wherein an x-coordinate value of a second anchor point of the further pair of anchor points is identical to an x-coordinate value of the second anchor point of the initial pair of anchor points.

7. The method of claim 6, wherein:
a y-coordinate value of the first anchor point of the further pair of anchor points is different to a y-coordinate value of the first anchor point of the initial pair of anchor points; or
wherein a y-coordinate value of the second anchor point of the further pair of anchor points is identical to a y-coordinate value of the second anchor point of the initial pair of anchor points.

8. The method of claim 5, wherein:
an x-coordinate value of the first anchor point of the initial pair of anchor points is selected in a range between a predetermined minimum threshold value, and a predetermined center threshold value; or
wherein an x-coordinate value of the second anchor point of the initial pair of anchor points is selected in a range between the predetermined center threshold value and a predetermined maximum threshold value.

9. The method of claim 8, wherein a y-coordinate value of the first anchor point of the initial pair of anchor points is equal to the x-coordinate value of the first anchor point of the initial pair of anchor points.

10. The method of claim 8, wherein a y-coordinate value of the second anchor point of the initial pair of anchor points is calculated based on a histogram of brightness values of the HDR video frame.

11. The method (1100) of claim 8, further comprising:
calculating a number of pixels having brightness values between the predetermined minimum threshold value and the predetermined maximum threshold value;
comparing values of histogram bins of the histogram of brightness values with the calculated number of pixels; and
in response to a value of one or more histogram bins being larger than the calculated number, clipping the pixel brightness values in the one or more histogram bins which are larger than a predetermined maximum display brightness value, and setting a y-coordinate value of the second anchor point to be an average value of the brightness values of all pixels belonging to the one or more histogram bins larger than the calculated number; and
in response to no value of one or more histogram bins being larger than the calculated number, clipping the pixel brightness values of pixels between the predetermined center threshold and the predetermined maximum threshold value, and setting the y-coordinate value of the second anchor point to be an average value of the brightness values of all pixels between the predetermined center threshold value of the HDR video frame and the predetermined maximum threshold value.

12. The method of claim 1, further comprising:
generating the tone mapping curve based on the one or more curve parameters.

13. The method of claim 1, further comprising:
receiving the metadata and the HDR video frame.

14. The method (1100) of claim 1, further comprising:
transmitting the one or more curve parameters as further metadata.

15. The method of claim 1, wherein:
the method is performed by an encoder or by a decoder.

16. A decoder comprising:
one or more processors; and
a non-transitory computer-readable storage medium coupled to the one or more processors and storing programming for execution by the one or more processors, wherein the programming, when executed by the one or more processors, configures the decoder to perform operations comprising:
obtaining a high dynamic range, HDR, video frame, and metadata associated to the HDR video frame;
obtaining a pair of anchor points, wherein the pair of anchor points comprises a first anchor point and a second anchor point of the tone mapping curve based on the HDR video frame and the metadata; and
generating the one or more curve parameters of the tone mapping curve based on the pair of anchor points, wherein the tone mapping curve comprises:

$$L^{\wedge\prime} = m\_a((m\_p \times L^{\wedge}(m\_n))/((m\_p-1) \times L^{\wedge}(m\_n)+1))^{\wedge}(m\_m) + m\_b,$$

wherein L is a brightness of an input pixel of a HDR video frame, m_n is a first value, particularly m_n=1, m_m is a second value, particularly m_m=2.4, and m_b is a determined perception quantization, PQ, value, wherein m_p is a brightness control factor and m_a is a scaling factor defining a maximum brightness of an output pixel, and wherein the one or more curve parameters comprise m_p and m_a.

17. The decoder of claim 16, wherein the obtaining a pair of anchor points comprises:
obtaining a plurality of pairs of anchor points;
generating a piecewise linear curve for each pair of the plurality of pairs of anchor points;
performing tone mapping on the HDR video frame based on each of the piecewise linear curves to obtain a plurality of tone-mapped HDR video frames; and
selecting the pair of anchor points for generating the one or more curve parameters from the plurality of pairs of anchor points based on the plurality of tone mapped HDR video frames.

18. The decoder of claim 17, wherein the piecewise linear curve of each pair of anchor points connects a predetermined minimum anchor point with the respective first anchor point, the respective first anchor point with the respective second anchor point, and the respective second anchor point with a predetermined maximum anchor point.

19. An encoder comprising:
one or more processors; and
a non-transitory computer-readable storage medium coupled to the one or more processors and storing programming for execution by the one or more processors, wherein the programming, when executed by the one or more processors, configures the encoder to perform operations comprising:
obtaining a high dynamic range, HDR, video frame, and metadata associated to the HDR video frame;
obtaining a pair of anchor points, wherein the pair of anchor points comprises a first anchor point and a second anchor point of the tone mapping curve based on the HDR video frame and the metadata; and
generating the one or more curve parameters of the tone mapping curve based on the pair of anchor points, wherein the tone mapping curve comprises:

$$L^{\wedge\prime} = m\_a((m\_p \times L^{\wedge}(m\_n))/((m\_p-1) \times L^{\wedge}(m\_n)+1))^{\wedge}(m\_m) + m\_b,$$

wherein L is a brightness of an input pixel of a HDR video frame, m_n is a first value, particularly m_n=1, m_m is a second value, particularly m_m=2.4, and m_b is a determined perception quantization, PQ, value, wherein m_p is a brightness control factor and m_a is a scaling factor defining a maximum brightness of an output pixel, and wherein the one or more curve parameters comprise m_p and m_a.

* * * * *